United States Patent
Sharma et al.

(10) Patent No.: US 7,433,314 B2
(45) Date of Patent: Oct. 7, 2008

(54) METHOD AND SYSTEM FOR ACKNOWLEDGING THE RECEIPT OF A TRANSMITTED DATA STREAM IN A WIRELESS PERSONAL AREA NETWORK

(75) Inventors: Sanjeev K. Sharma, Fremont, CA (US); Jinwoo Hong, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 665 days.

(21) Appl. No.: 10/928,067

(22) Filed: Aug. 27, 2004

(65) Prior Publication Data

US 2005/0265371 A1    Dec. 1, 2005

Related U.S. Application Data (60) Provisional application No. 60/576,019, filed on Jun. 1, 2004.

(51) Int. Cl.
  *H04J 3/24* (2006.01)
(52) U.S. Cl. ............... 370/236; 370/338; 370/392; 370/400; 370/473; 714/748

(58) Field of Classification Search .......... None
  See application file for complete search history.

(56) References Cited

U.S. PATENT DOCUMENTS

| | | | |
|---|---|---|---|
| 6,317,430 B1* | 11/2001 | Knisely et al. | 370/394 |
| 6,643,813 B1* | 11/2003 | Johansson et al. | 714/748 |
| 6,658,619 B1* | 12/2003 | Chen | 714/748 |
| 2002/0172208 A1* | 11/2002 | Malkamaki | 370/400 |
| 2003/0210710 A1* | 11/2003 | Odman | 370/471 |
| 2005/0157715 A1* | 7/2005 | Hiddink et al. | 370/389 |

* cited by examiner

*Primary Examiner*—Wing F. Chan
*Assistant Examiner*—Brian Roberts
(74) *Attorney, Agent, or Firm*—Knobbe Martens Olson & Bear LLP (57) ABSTRACT

A method and system for acknowledging the receipt of a transmitted data stream in a wireless personal area network (WPAN) are disclosed. In one embodiment, a plurality of medium access control (MAC) protocol data units (MPDUs) are transmitted from a transmitting party to a receiving party, and the receiving entity sends a delayed acknowledgment frame to the transmitting party using a bitmap field for each of the fragmented packets instead of using two bytes of an MPDU block for acknowledging each received MPDU. The bitmap field includes a plurality of bitmap values corresponding to the plurality of MPDUs, and each of the plurality of bitmap values is indicative of whether each of the MPDUs is received or not.

15 Claims, 6 Drawing Sheets

METHOD AND SYSTEM FOR ACKNOWLEDGING THE RECEIPT OF A TRANSMITTED DATA STREAM IN A WIRELESS PERSONAL AREA NETWORK

RELATED APPLICATIONS

This application claims priority under 35 U.S.C. § 119(e) from provisional application No. 60/576,019 filed on Jun. 1, 2004, which is hereby incorporated by reference.

BACKGROUND OF THE INVENTION

1. Field of the Invention

This invention relates to a wireless data communication system, and particularly to a method and system for acknowledging the receipt of a transmitted data stream in a wireless personal area network (WPAN).

2. Description of the Related Technology

Recently, a variety of computer network systems that make use of wireless communication systems have been widely used. Such network systems include a local area network (LAN), a wide area network (WAN), a wireless local area network (WLAN), a wireless personal area network (WPAN), a general packet radio service (GPRS) network and other wireless network systems. The network systems allow communication between various end terminals such as a personal computer (desktop, laptop, and palmtop), a mobile phone, or other portable communication devices.

In most of the above networks, when an end terminal device transmits data, it encapsulates the data into a sequence of packets with the destination address being placed inside the header of each packet. Each packet is then transmitted onto a network. All other connected devices read the address in the packet header, but a device will only read the data in a packet if it recognizes its own address. Once the packet has been read, the destination device acknowledges the receipt of a received packet by responding to the source (the source address is also placed in the packet header). The acknowledgment packet tells the source that the data was received successfully, or that it was corrupt and re-transmission is necessary.

SUMMARY OF CERTAIN ASPECTS OF THE INVENTION

One aspect of the invention provides a method of acknowledging the receipt of a transmitted data stream in a wireless personal area network (WPAN). The method comprises transmitting a plurality of fragmented packets (MPDUs) from a transmitting entity to a receiving entity, and sending a delayed acknowledgement frame, at the receiving entity, which acknowledges the receipt of each of the plurality of MPDUs using a bitmap field.

Another aspect of the invention provides a method of acknowledging the receipt of a transmitted data stream in a wireless personal area network (WPAN). The method comprises receiving a plurality of fragmented packets (MPDUs) from a transmitting entity, and sending a delayed acknowledgement frame, which acknowledges the receipt of each of the plurality of MPDUs with a bitmap field, to the transmitting entity.

Another aspect of the invention provides a method of acknowledging the receipt of a transmitted data stream in a wireless personal area network (WPAN). The method comprises i) receiving a plurality of data packets from a transmitting entity, ii) determining which ones of the plurality of data packets are fragmented, iii) generating a bitmap field which includes a plurality of bitmap values corresponding to the determined fragmented packets, wherein each of the plurality of bitmap values is indicative of whether each of the determined fragmented packets is received or not, iv) generating a delayed acknowledgement frame which includes the generated bitmap field, and v) sending the generated delayed acknowledgement frame to the transmitting entity.

Still another aspect of the invention provides a system for acknowledging the receipt of a transmitted data stream in a wireless personal area network (WPAN). The system comprises a first piconet device configured to transmit a plurality of fragmented packets (MPDUs), and a second piconet device configured to receive the plurality of MPDUs and send a delayed acknowledgement frame, which acknowledges the receipt of each of the plurality of MPDUs using a bitmap field, to the first piconet device.

Still another aspect of the invention provides a system for acknowledging the receipt of a transmitted data stream in a wireless personal area network (WPAN). The system comprises a device operating within a network communicating using an IEEE 802.15.3 protocol and being programmed to i) receive a plurality of fragmented packets (MPDUs) from a transmitting entity, and ii) send a delayed acknowledgement frame, which acknowledges the receipt of each of the plurality of MPDUs with a bitmap field, to the transmitting entity.

Still another aspect of the invention provides a computer data signal embedded in a carrier wave. The signal comprises a bitmap field including a plurality of bitmap values, each of the plurality of bitmap values indicative of whether each of a plurality of MAC protocol data units (MPDUS) is received or not, wherein the plurality of MPDUs form a MAC service data unit (MSDU) and are sequentially transmitted to a receiving entity, wherein the signal is a delayed acknowledgement frame and follows the protocol of the IEEE 802.15.3 standard.

Yet another aspect of the invention provides one or more processor readable storage devices having processor readable code embodied on the processor readable storage devices, the processor readable code for programming one or more processors to perform a method of acknowledging the receipt of a transmitted data stream in a wireless personal area network (WPAN). The method comprises i) receiving a plurality of fragmented packets (MPDUs) from a transmitting entity, and ii) sending a delayed acknowledgement frame, which acknowledges the receipt of each of the plurality of MPDUs with a bitmap field, to the transmitting entity. Yet another aspect of the invention is a computer readable medium storing a computer program to perform a method of acknowledging the receipt of a transmitted data stream in a wireless personal area network (WPAN), the method comprising: i) receiving a plurality of medium access control (MAC) service data units (MSDUs) from a transmitting entity, wherein at least one of the received MSDUs is fragmented into a plurality of fragmented packets (MPDUs) and wherein at least one of the received MSDUs is non-fragmented, ii) determining whether the received MSDUs are fragmented or not, iii) for only the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of the bitmap field varies according to the number of the at least one fragmented MSDU, iv) generating a delayed acknowledgement frame which includes the generated bitmap field, wherein the delayed acknowledgement frame further comprises a section configured to acknowledge the at least one non-fragmented MSDU without the use of a bitmap field and v) sending the delayed acknowledgement frame to the transmitting entity.

Yet another aspect of the invention provides a system for acknowledging the receipt of a transmitted data stream in a wireless personal area network (WPAN). The system comprises means for receiving a plurality of fragmented packets (MPDUs) from a transmitting entity, and means for sending a delayed acknowledgement frame, which acknowledges the receipt of each of the plurality of MPDUs with a bitmap field, to the transmitting entity.

BRIEF DESCRIPTION OF THE DRAWINGS

The foregoing and other features of the invention will become more fully apparent from the following description and appended claims taken in conjunction with the following drawings, in which like reference numerals indicate identical or functionally similar elements.

DETAILED DESCRIPTION OF CERTAIN EMBODIMENTS OF THE INVENTION

Figure 1:
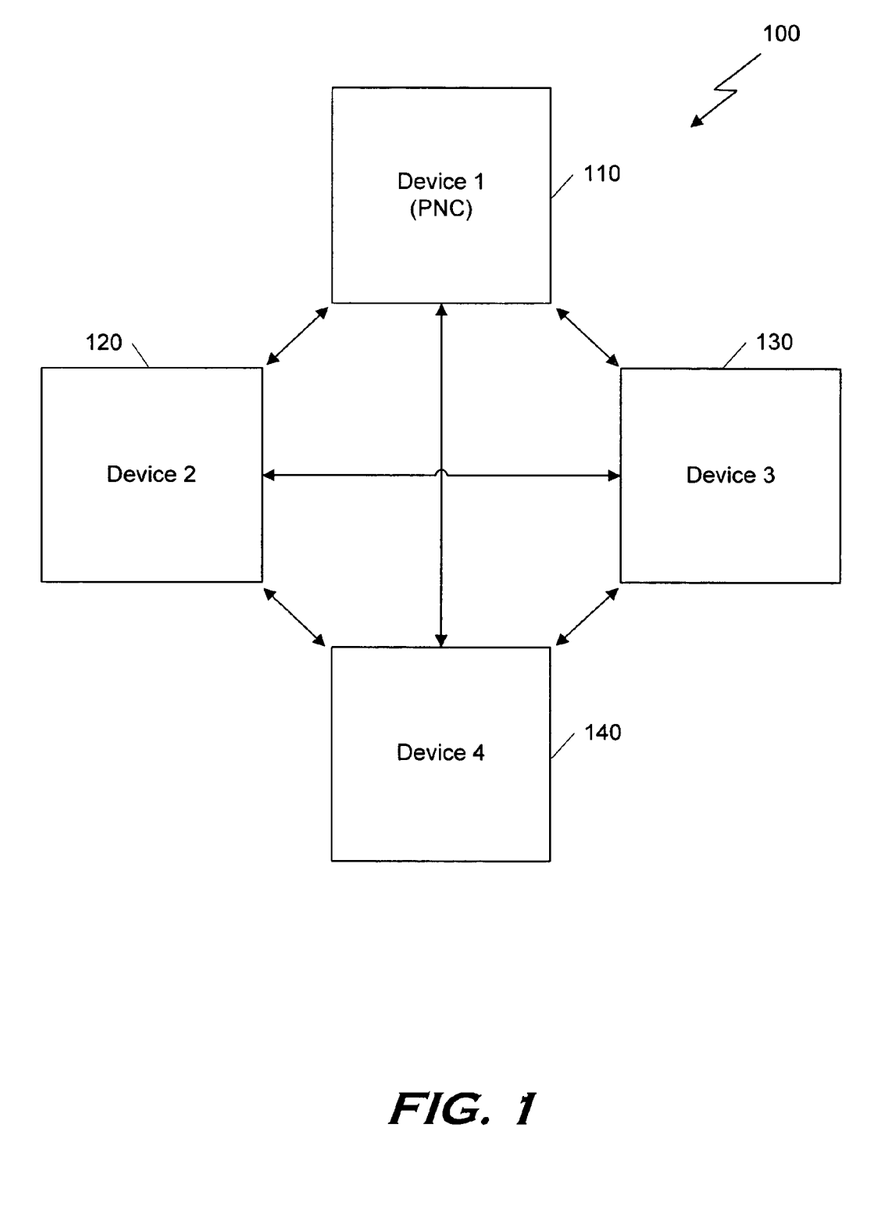
FIG. 1 illustrates an exemplary wireless personal area network (WPAN) system.

FIG. 1 illustrates an exemplary wireless personal area network (WPAN) system 100. The network system 100 comprises devices 110-140 communicating data with each other. In one embodiment, the network system 100 follows the protocol of the IEEE 802.15.3 standard. In one embodiment, the network system 100 can communicate with other peer IEEE 802.15.3 systems.

In one embodiment, each of the devices 110-140 includes one of the following: a digital video camera, a portable video display, a wireless surround speaker, an electronic game device, a printer, a cordless phone and other business and consumer device.

In one embodiment, one of the devices 110-140 is determined to be a piconet coordinator 110 (or piconet controller; hereinafter "piconet coordinator"). Thereafter, the piconet coordinator 110 coordinates the data communication among the remaining devices 120-140 (typically referred to as "piconet devices" in the 802.15.3 standard) by, for example, providing time slots for each device to communicate data with each other. The piconet coordinator 110 can return to a normal piconet device and another device can perform the piconet coordinator function. In this application, all of the devices 110-140 will be frequently referred to as piconet devices.

In one embodiment, data communication within the system 100 (FIG. 1) is carried out using IEEE 802.15.3 or other suitable wireless communication standards, either known today or developed in the future. The specification of IEEE 802.15.3 can be found in "Wireless Medium Access Control (MAC) and Physical (PHY) Layer Specifications for High Rate Wireless Personal Area Networks (WPAN)", Draft P802.15.3/D17, February 2003, which is incorporated herein by reference. The IEEE 802.15.3 standard provides portable consumer electronic devices with whole home coverage. The standard addresses, for example, the need for mobility, quality of service (QoS) and fast connectivity for the broad range of consumer electronic devices.

Typically, the data communication between the piconet devices 120-140 is performed within a short range distance, e.g., 10 m. In one embodiment, the piconet coordinator 110 can coordinate the data communication with up to about 250 devices (although three piconet devices 120-140 are shown in FIG. 1).

A description of the general operation of a typical 802.15.3 based network system, including a piconet coordinator, can be found, for example, in "Wireless Medium Access Control (MAC) and Physical (PHY) Layer Specifications for High Rate Wireless Personal Area Networks (WPAN)", Draft P802.15.3/D17, February 2003, which is incorporated by reference herein.

Figure 2:
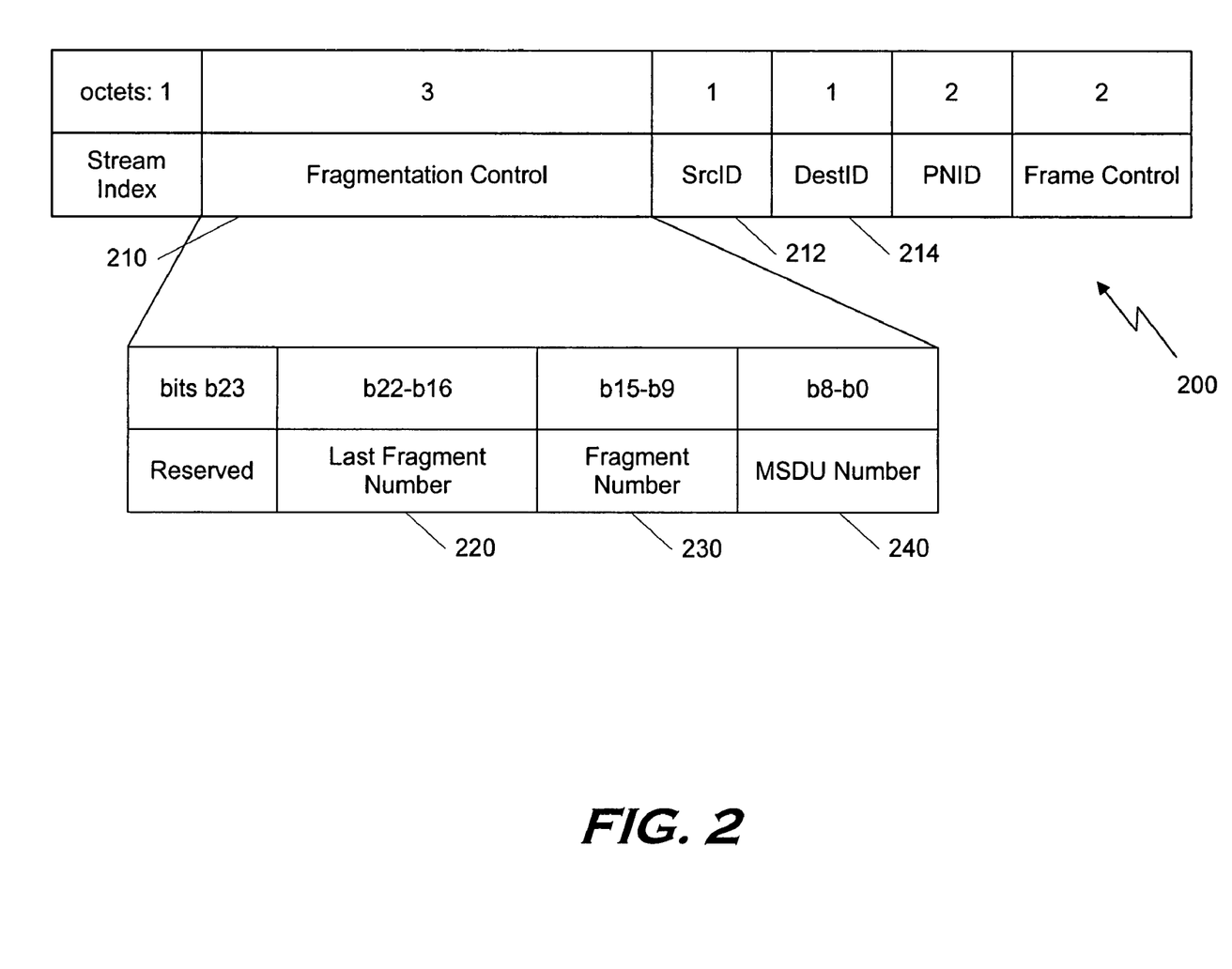
FIG. 2 illustrates a data format of a Medium Access Control (MAC) header according to the IEEE 802.15.3 standard.

FIG. 2 illustrates a data format of a Medium Access Control (MAC) header according to the IEEE 802.15.3 standard. In the 802.15.3 standard, a frame (or packet) typically includes a frame body and an error correction field (such as frame check sequence (FCS) field) in addition to the MAC header 200. The MAC header 200 includes, among other things, a fragmentation control field 210, and source and destination IDs (212, 214). The fragmentation control field 210 includes information related to a frame (or packet) fragmentation.

In one embodiment such as in the IEEE 802.15.3 network, before transmission, a packet (generally referred to as a MAC service data unit (MSDU) in the 802.15.3 standard) can be fragmented into a plurality of smaller packets or fragments. Each fragment is referred to as a MAC protocol data unit (MPDU) in the standard. Throughout this application, fragmented packets and fragments will be used interchangeably.

Each fragment (MPDU) has the same data format as that of the entire data packet (MSDU). Thus, each of MSDU and MPDU includes the MAC header shown in FIG. 2 as well as a frame body and an FCS. A destination device will reassemble the received fragmented packets. This method provides less chance of a packet being lost due to noise (higher loss probability of larger packets) and causes less bandwidth loss due to the small size of packet. In addition, even if the fragments are lost, an even smaller amount of data is actually lost compared to the entire packet transmission. Thus, this fragmentation and reassembling is frequently used in various communication standards.

Each fragment is generally treated as an independent packet during the transmission. Thus, an MPDU is frequently used to represent both an independent packet (MSDU) and a fragmented packet (MPDU) in the 802.15.3 standard. After receiving each fragment, the destination device sends an acknowledgment (ACK) to the source device to indicate the reception of each of the fragmented packets. In the 802.15.3 standard, three acknowledgement frames are used: an immediate acknowledgement frame, a delayed acknowledgement frame and a no acknowledgement frame. The immediate acknowledgement frame is sent to acknowledge an individual packet as soon as it is received by a receiving entity. The delayed acknowledgement is sent to acknowledge a group (or block) of packets after the entire group of packets are received. The no acknowledgement is used if the transmitter does not want the transmitted packet to be acknowledged by the receiver. Various embodiments of the invention relate to the delayed acknowledgement. Throughout the specification, a delayed acknowledgement (frame) and an acknowledgement (frame) will be used interchangeably.

In one embodiment as shown in FIG. 2, the fragmentation control field 210 (e.g., 24 bits assigned according to the 802.15.3 standard) includes, among other things, a last fragment number field 220 (7 bits assigned according to the 802.15.3 standard), a fragment number field 230 (e.g., 7 bits assigned according to the 802.15.3 standard) and an MSDU number field 240 (9 bits assigned according to the same standard).

The MSDU number field 240 represents the number of an MSDU which includes a set of fragments (MPDUs; if fragmented) being transmitted. The fragment number field 230 represents the number of a fragment (MPDU) which is being transmitted. In the case of an MSDU being fragmented into a plurality of MPDUs, the MSDU numbers of all of the plurality of MPDUs remain the same but the fragment number of each MPDU is incremented by one. In one embodiment, one MSDU can include up to 128 fragments (MPDUs; 7bits=$2^7$=128; see "230" in FIG. 2). The last fragment number field 220 represents the total number of fragments which belong to the fragmented MSDU.

Figure 3:
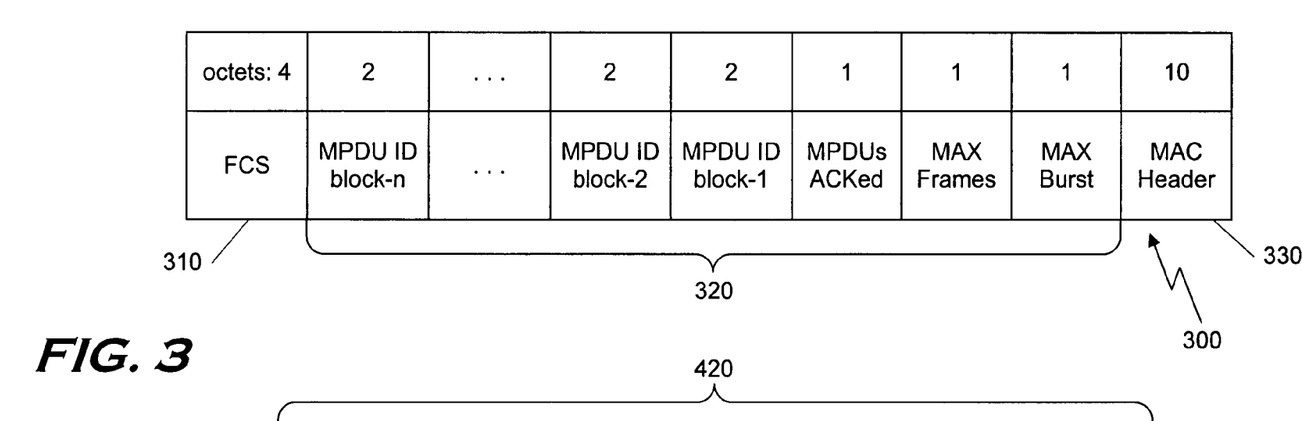
FIG. 3 illustrates a data format of a delayed acknowledgement frame according to the IEEE 802.15.3 standard.

FIG. 3 illustrates a data format of a delayed acknowledgement frame according to the 802.15.3 standard. The delayed acknowledgement frame 300 includes an FCS field 310, a frame body 320 and a MAC header 330. The frame body 320 includes, among other things, a plurality of MPDU IDs fields (from block 1 to block n; each field assigned 2 bytes in the 802.15.3 standard). The frame body 320 is used to acknowledge received fragmented packets or non-fragmented packets.

As shown in FIG. 3, in the current 802.15.3 standard, each packet (either fragmented (MPDU) or non-fragmented (MSDU)) is acknowledged individually using two bytes (16 bits). For example, if two MSDUs (one fragmented into 10 MPDUs and the other non-fragmented) are transmitted, 22 bytes (2 bytes per MPDU (20 bytes) and 2 bytes per MSDU) are required to acknowledge the transmitted packets. The size of the frame body 320 of the delayed acknowledgement frame can significantly increase as the number of fragmented packets increases.

If multiple MSDUs (at least one of them fragmented) are received and needed to be acknowledged using this delayed acknowledgement method, the size of the delayed acknowledgement frame can be significant. The more MSDUs are fragmented, the more communication overhead will be caused. The significant increase in the frame body of a delayed acknowledgement frame can require higher bandwidth to transmit and reduces the throughput efficiency. Furthermore, the increase in the frame body also increases the loss probability of a transmitted packet, which may cause the retransmission of all the packets and hence wastage of bandwidth. Thus, a more efficient delayed acknowledgment in a wireless communication environment, such as the IEEE 802.15.3 based network is desired.

One aspect of the invention provides a system and method of acknowledging the receipt of a transmitted data stream in a wireless personal area network, wherein a plurality of MPDUs are transmitted from a transmitting party to a receiving party, and wherein the receiving party sends a delayed acknowledgement frame to the transmitting party using a bitmap field for each of the fragmented packets instead of using two bytes of an MPDU block for acknowledging each received MPDU. The bitmap field includes a plurality of bitmap values corresponding to the plurality of MPDUs, and each of the plurality of bitmap values is indicative of whether each of the MPDUs is received or not.

Figure 4:
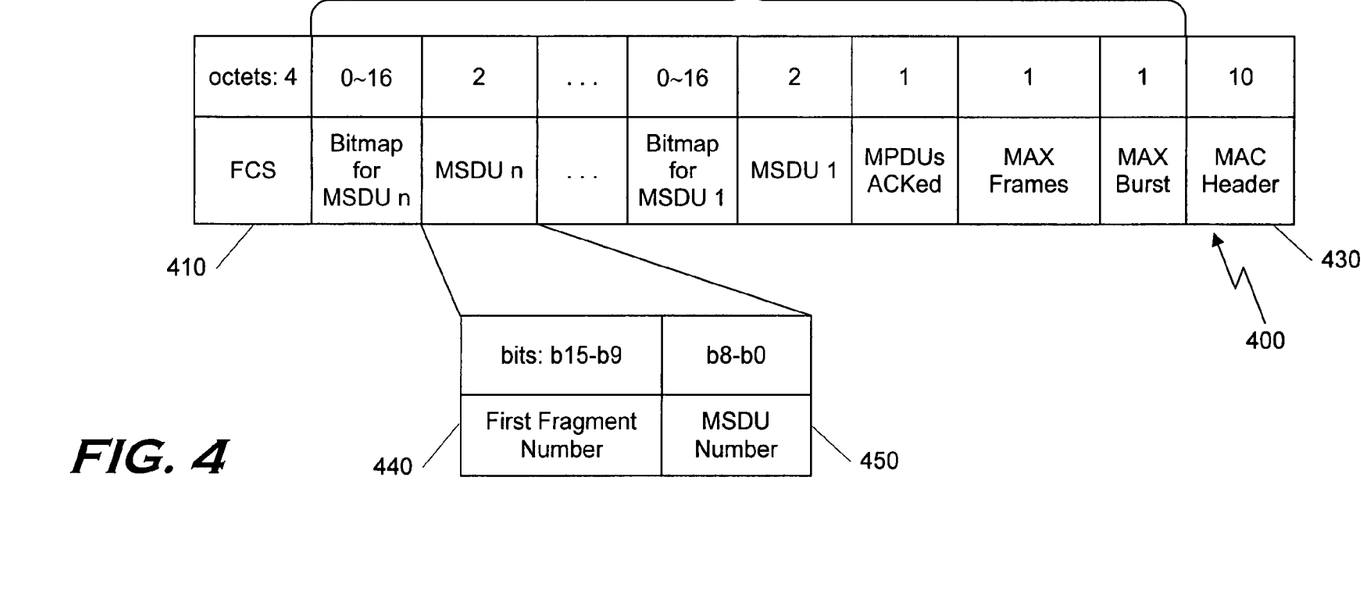
FIG. 4 illustrates a data format of a delayed acknowledgement frame according to one embodiment of the invention.

FIG. 4 illustrates an exemplary data format of a delayed acknowledgement frame according to one embodiment of the invention. The delayed acknowledgement frame 400 includes an FCS field 410, a frame body 420 and a MAC header 430. In one embodiment, the frame body 420 includes, among other things, at least one MSDU field (2 bytes assigned in the 802.15.3 standard) and a bitmap field (up to 16 bytes assigned in the 802.15.3 standard), if this MSDU has at least one fragment. In one embodiment shown in FIG. 4, the frame body 420 includes a plurality of MSDU fields (from MSDU 1 to MSDU n) and a plurality of bitmap fields corresponding to the plurality of MSDU fields (if all of MSDUs are fragmented). The frame body 420 also includes a "MPDUs Acked" (MPDUs acknowledged) field (1 byte=8 bits assigned in 802.15.3 standard). Thus, in the standard, one delayed acknowledgement frame can include up to 256 packets ($2^8$) regardless of the packets being fragmented or non-fragmented.

In one embodiment, the frame body 420 includes two MSDU blocks each of which includes 128 fragments and a bitmap field corresponding to the 128 fragments. If there are no fragmented packets received, no bitmap field will be generated. In this situation, the fragment number fields 220, 230 shown in FIG. 2 will be set to be zero. In one embodiment, some MSDUs are fragmented and others are not depending on communication circumstances. For each of the fragmented MSDUs, there will be a bitmap field generated and added to the acknowledgement frame as shown in FIG. 4. For the non-fragmented MSDUs, there will be no bitmap field generated.

Each MSDU block includes a first fragment number field 440 and an MSDU number field 450. The MSDU number field 450 (9 bits assigned in the 802.15.3 standard) represents the number of an MSDU which is being delayed acknowledged. The first fragment number field 440 represents the fragment number (see FIGS. 6A and 6B) from which the delayed acknowledgement starts. In one embodiment, this first fragment number is obtained from the fragment number field 230 (see FIG. 2) of the received frame's MAC header 200.

Figure 5:
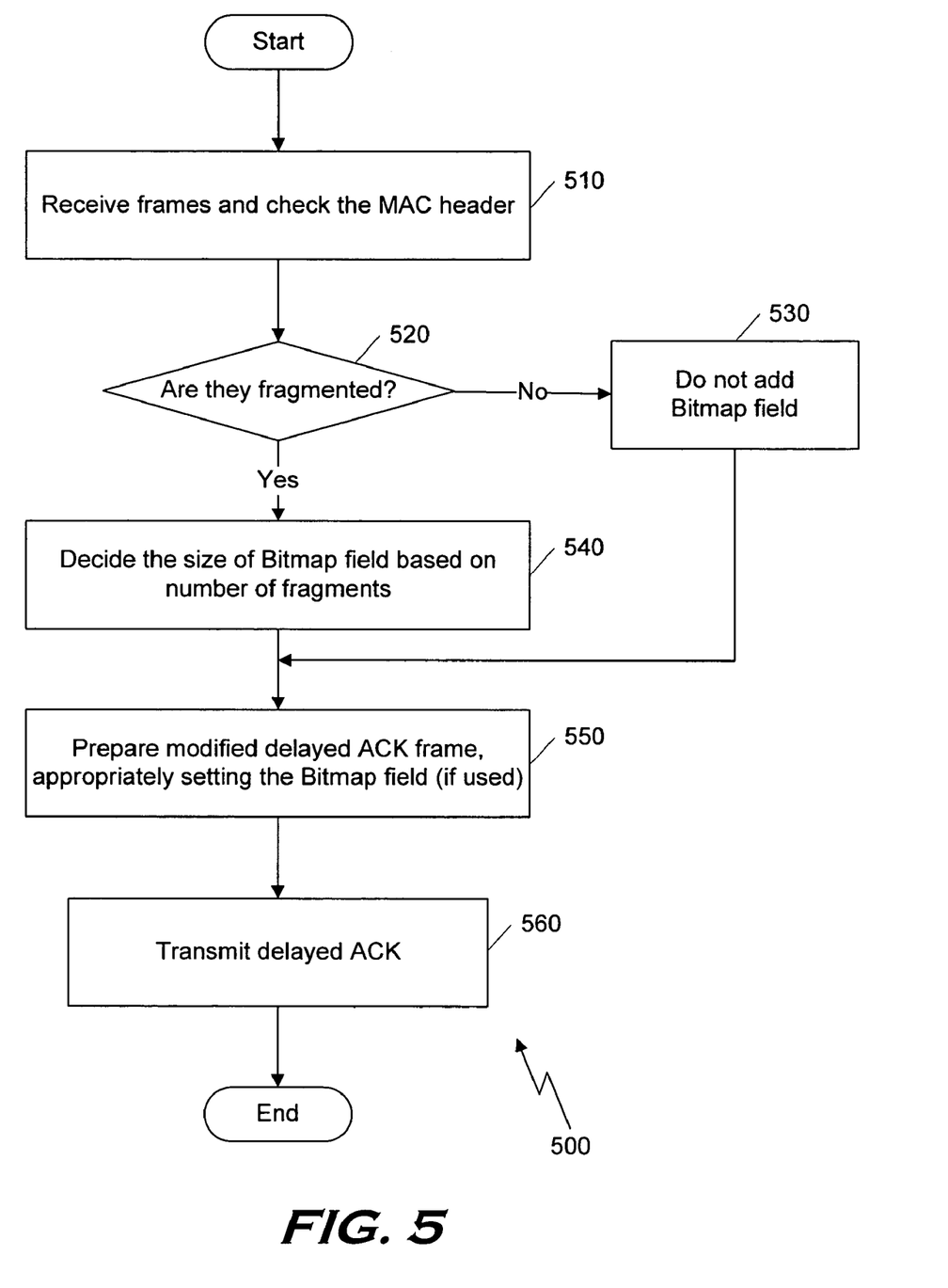
FIG. 5 illustrates an exemplary flowchart which shows a delayed acknowledgement procedure according to one embodiment of the invention.

FIG. 5 illustrates an exemplary flowchart which shows a delayed acknowledgment procedure according to one embodiment of the invention. In one embodiment, the acknowledgment procedure 500 is implemented in a conventional programming language, such as C or C++ or another suitable programming language. In one embodiment of the invention, the program is stored on a computer accessible storage medium at the piconet devices 110-140. In another embodiment, the program can be stored in other system locations so long as it can perform the acknowledgment procedure 500 according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, each of the piconet devices 110-140 comprises a processor (not shown) configured to or programmed to perform the acknowledgment procedure 500. The program may be stored in the processor or a memory of the piconet devices 110-140. In various embodiments, the processor may have a configuration based on Intel Corporation's family of microprocessors, such as the Pentium family and Microsoft Corporation's windows operating systems such as WINDOWS 95, WINDOWS 98, WINDOWS 2000 or WINDOWS NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the acknowledgment procedure 500 can be implemented with an embedded software.

In one embodiment, the procedure 500 of FIG. 5 may be implemented with the IEEE 802.15.3 standard. For convenience, the procedure 500 will be explained based on the IEEE 802.15.3 standard. Depending on the embodiments, additional states may be added, others removed, or the order of the states changes.

Referring to FIGS. 1 and 4-6, the operation of each of the piconet devices 110-140 will be described in more detail. In one embodiment, data communication within the system 100 is carried out using the IEEE 802.15.3 standard. Each of the piconet devices 110-140 can be a receiving entity and a transmitting entity. During a certain period of time, one of the piconet devices 110-140 can act as a receiving entity while another of the piconet devices 110-140 can act as a transmitting entity.

Referring to FIG. 5, the receiving entity receives frames (either MPDUs or MSDUs) and checks the MAC header of each of the received frames from a transmitting entity (510). In procedure 520, the receiving device determines whether or not the received frames are fragmented. Since the fragmentation control field 210 of the MAC header 200 (see FIG. 2) includes information as to whether a transmitted frame is fragmented or not, this procedure can be performed by checking the fragmentation control field 210 of the MAC header 200 of each received frame.

If it is determined in procedure 520 that the received frames are fragmented, the receiving entity decides the size of a bitmap field, to be generated, for each of the received MSDUs based on the number of the fragments (540). As one example, it is assumed that there are three MSDUs being transmitted, wherein each of MSDUs 1 and 3 is fragmented into ten MPDUs, and MSDU 2 is not fragmented. In one embodiment such as in 802.15.3 standard, if the number of fragments for an MSDU is equal to or less than 8, one byte of a bitmap field is generated and added. Also, if the number of fragments for an MSDU is greater than 8 but equal to or less than 16, two bytes of a bitmap field may be generated and added. Similarly, if the number of fragments for an MSDU is greater than 120 but equal to or less than 128, sixteen bytes of a bitmap field may be generated and added.

In contrast, if no fragment is received (i.e., non-fragmented MSDU), a bitmap field is not added to an acknowledgement frame for the non-fragmented MSDU (530). In this situation, two bytes are used to acknowledge the non-fragmented MSDU packet as in the current 802.15.3 standard.

The receiving entity prepares a modified delayed acknowledgement frame by appropriately setting the bitmap field, if applicable (550). For example, in FIG. 4, if only MSDU 1 is fragmented and the remaining MSDUs are not fragmented, a bitmap field is added only to the MSDU 1 and the rest of the MSDUs would not have a bitmap field therefore in the delayed acknowledgement frame. The receiving entity (one of the devices 110-140) transmits the prepared delayed acknowledgement frame to the transmitting entity (another of the devices 110-140) (560).

EXAMPLE

An example, which quantifies the advantage of one embodiment of the invention over the current 802.15.3 standard, will be described. It is assumed that 256 MPDUs, which have been fragmented from two MSDUs (each fragmented into 128 MPDUs), transmitted and need to be delayed acknowledged. Under the current 802.15.3 standard, since each fragmented MPDU needs two bytes for a delayed acknowledgement, the size of the frame body for the acknowledgement will be 512 bytes (256×2). Also, the remaining frame body of the acknowledgement frame will need 17 bytes (10 bytes of MAC header, 1 byte of MAX burst, 1 byte of Max Frames, 1 byte of MPDUs Acked and 4 bytes of FCS; see FIG. 3). Thus, the total size of the acknowledgement frame will be 529 bytes (512+17) under the current 802.15.3 standard.

In contrast, in one embodiment of the invention, 16 bytes (128 bits) of a bitmap field will be needed to acknowledge all of the 128 fragmented MPDUs for each of the MSDUs. Also, since the single MSDU takes 2 bytes at the maximum (see FIG. 4), the size of the frame body for the one MSDU acknowledgement will be 18 bytes (16+2). Thus, the size of the bitmaps and two MSDU blocks for acknowledging the 256 MPDUs will be 36 bytes (18×2). The remaining frame body of the acknowledgement frame will need 17 bytes as in the current 802.15.3 standard. Thus, the total size of the acknowledgement frame will be 53 bytes (36+17) under the embodiment of the invention. Therefore, this embodiment of the invention can provide bandwidth savings of [(529−53)/529]×100%=about 90%.

Figure 6A:
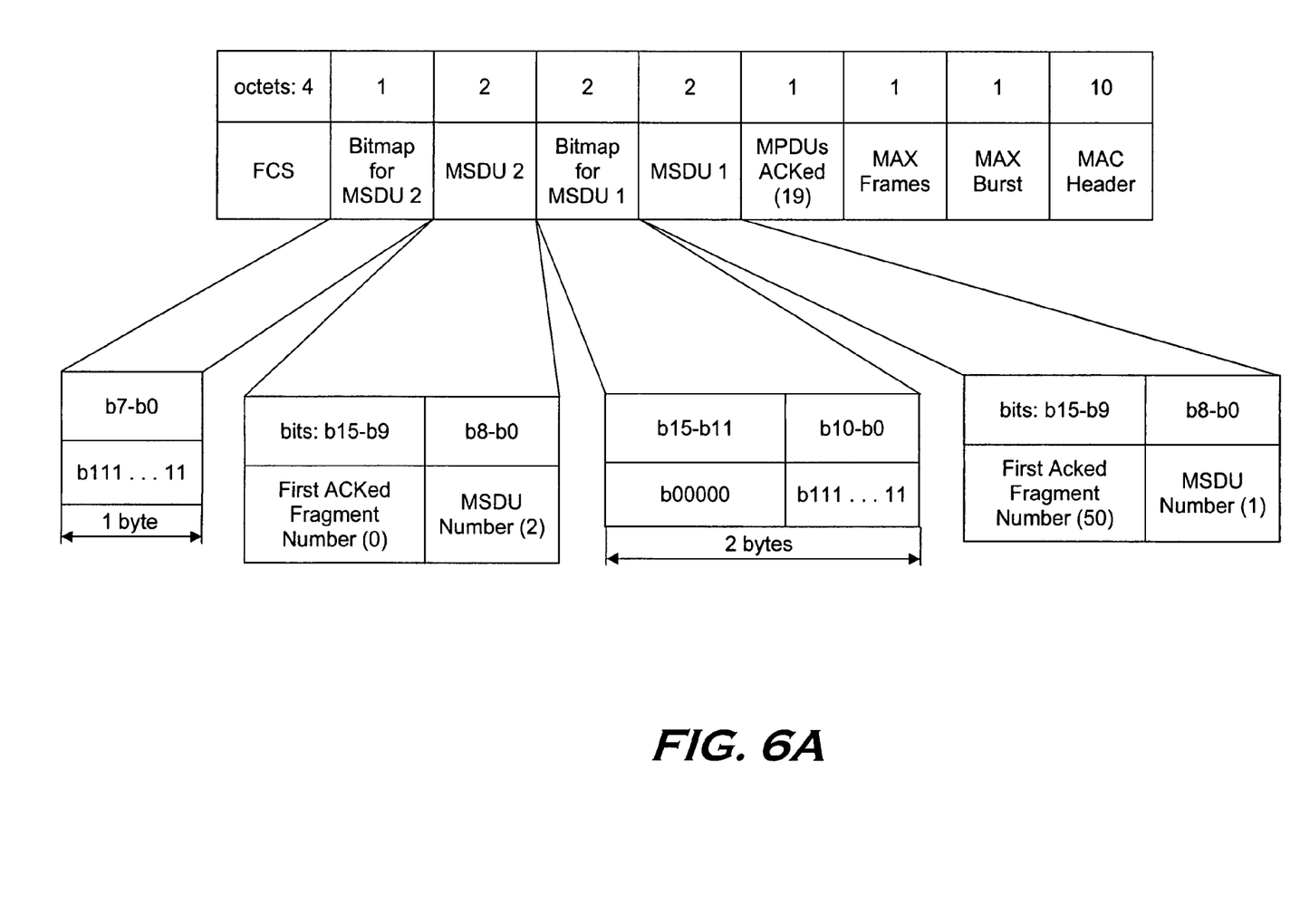
FIG. 6A illustrates an exemplary data format of a delayed acknowledgement frame in case of no loss of a fragment according to one embodiment of the invention.
Figure 6B:
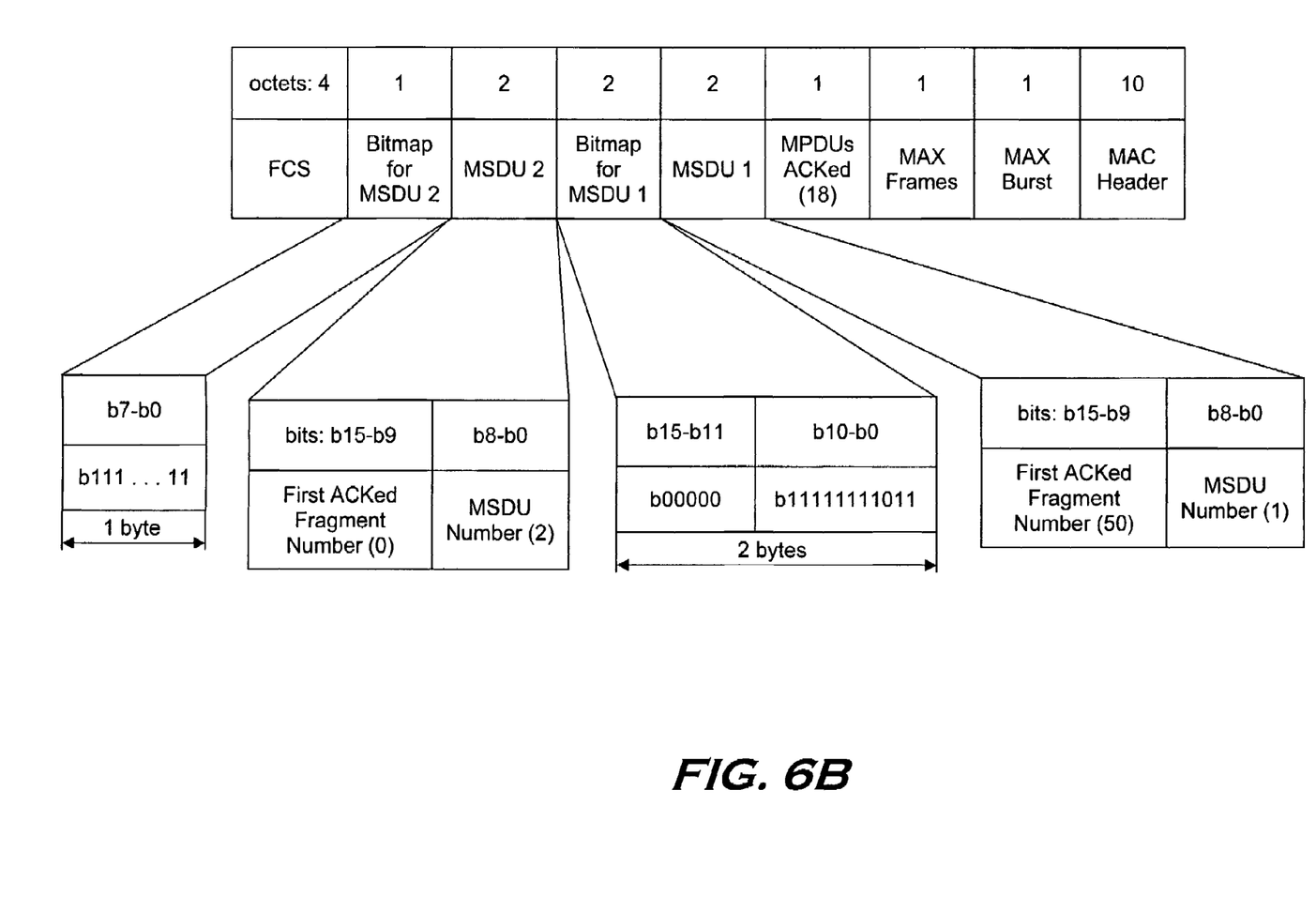
FIG. 6B illustrates an exemplary data format of a delayed acknowledgement frame in case of loss of a fragment according to another embodiment of the invention.

FIG. 6A illustrates an exemplary data format of a delayed acknowledgement frame in case of no loss of a fragment according to one embodiment of the invention. FIG. 6B illustrates an exemplary data format of a delayed acknowledgement frame in case of loss of a fragment according to another embodiment of the invention.

Referring to FIGS. 6A and 6B, it can be seen that MSDU 1 is fragmented into eleven MPDUs (fragments 50-60) and MSDU 2 is fragmented into eight MPDUs (fragments 0-7). In each of the MSDUs, the first fragment numbers are 50 and 0, respectively as shown in FIGS. 6A and 6B. Fragment numbers 0-49, which belong to MSDU 1, have been already acknowledged in the previous delayed acknowledgement frame (not shown). In the embodiment of FIGS. 6A and 6B, since in MSDU 2 the total number of fragments is 8, one byte of a bitmap field has been generated. Also, since in MSDU 1 the number of fragments is 11, two bytes of a bitmap field have been generated.

In one embodiment shown in FIGS. 6A and 6B, a bitmap field set as "b11111111" represents that eight fragments for MSDU 2 are correctly received and delay acknowledged. Also, as shown in FIG. 6A, a bitmap field set as "b11111111111" can represent that eleven fragments for MSDU 1 are correctly received and delay acknowledged.

In another embodiment shown in FIG. 6B, a bitmap field set as "b11111111011" represents that fragment 52 is lost but the remaining fragments are properly received. Once the MSDU 1 is delayed acknowledged, the transmitting device can determine which fragment(s) is(are) missing based on the bitmap field and resend the lost fragment (fragment 52) to the receiving device.

According to various embodiments of the invention, the overhead related to delayed acknowledgments can be significantly reduced. In addition, one embodiment of the invention can significantly improve the throughput efficiency of the overall system. Furthermore, various embodiments of the invention can improve the chances of a delayed acknowledgement frame being successfully transmitted, which reduces the probability of retransmission of all frames.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of acknowledging the receipt of a transmitted data stream in a wireless personal area network (WPAN), the method comprising:

transmitting a plurality of medium access control (MAC) service data units (MSDUs) to a receiving entity, wherein at least one of the MSDUs is fragmented into a plurality of fragmented packets (MPDUs) and wherein at least one of the MSDUs is non-fragmented; and receiving a delayed acknowledgement frame from the receiving entity, wherein the delayed acknowledgement frame comprises i) a bitmap field configured to acknowledge only the at least one fragmented MSDU and ii) a section configured to acknowledge the at least one non-fragmented MSDU without the use of a bitmap field, and wherein the size of each of the bitmap fields for each of the at least one fragmented MSDU varies according to the number of MPDUs each of the at least one fragmented MSDU is fragmented into.

2. The method of claim 1, wherein the wireless personal area network follows the protocol of the IEEE 802.15.3 standard.

3. A method of acknowledging the receipt of a transmitted data stream in a wireless personal area network (WPAN), the method comprising:

receiving a plurality of medium access control (MAC) service data units (MSDUs) from a transmitting entity, wherein at least one of the received MSDUs is fragmented into a plurality of fragmented packets (MPDUs) and wherein at least one of the received MSDUs is non-fragmented;

determining whether the received MSDUs are fragmented or not;

for only the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUs each of the at least one fragmented MSDU is fragmented into;

generating a delayed acknowledgement frame which includes the generated bitmap field, wherein the delayed acknowledgement frame further comprises a section configured to acknowledge the at least one non-fragmented MSDU without the use of a bitmap field; and sending the delayed acknowledgement frame to the transmitting entity.

4. The method of claim 3, wherein the method is performed in each of piconet devices which form the wireless personal area network.

5. The method of claim 3, further comprising determining a size of the bitmap field based on the total number of fragments to be delayed acknowledged for an MSDU, which is calculated from the first fragment number field and the last fragment number field of the fragmentation control part of the MAC header.

6. The method of claim 3, wherein the determining comprises checking a fragment number field of the packet header of each of the received data packets.

7. A system for acknowledging the receipt of a transmitted data stream in a wireless personal area network (WPAN), the system comprising:

a piconet device configured to transmit a plurality of medium access control (MAC) service data units (MSDUs) to a receiving piconet device, wherein at least one of the MSDUs is fragmented into a plurality of fragmented packets (MPDUs), wherein at least one of the MSDUs is non-fragmented, wherein the piconet device is further configured to receive a delayed acknowledgement frame from the receiving piconet device, wherein the delayed acknowledgement frame comprises i) a bitmap field configured to acknowledge only the at least one fragmented MSDU and ii) a section configured to acknowledge the at least one non-fragmented MSDU without the use of a bitmap field, and wherein the size of each of the bitmap fields for each of the at least one fragmented MSDU varies according to the number of MPDUs each of the at least one fragmented MSDU is fragmented into.

8. The system of claim 7, further comprising a piconet coordinator configured to coordinate the packet communication between the two piconet devices.

9. The system of claim 7, wherein each of the piconet devices is selected according to one of the following: a digital video camera, a portable video display, a wireless surround speaker, an electronic game device, a printer, a cordless phone and other business and consumer device.

10. A system for acknowledging the receipt of a transmitted data stream in a wireless personal area network (WPAN), the system comprising:

a device operating within a network communicating using an IEEE 802.15.3 protocol and being programmed to:

receive a plurality of medium access control (MAC) service data units (MSDUs) from a transmitting entity, wherein at least one of the received MSDUs is fragmented into a plurality of fragmented packets (MPDUs) and wherein at least one of the received MSDUs is non-fragmented;

determine whether the received MSDUs are fragmented or not;

for only the MSDU(s) determined as fragmented, generate a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUs each of the at least one fragmented MSDU is fragmented into;

generate a delayed acknowledgement frame which includes the generated bitmap field, wherein the delayed acknowledgement frame further comprises a section configured to acknowledge the at least one non-fragmented MSDU without the use of a bitmap field; and send the delayed acknowledgement frame to the transmitting entity.

11. The system of claim 10, wherein the device is selected according to one of the following: a digital video camera, a portable video display, a wireless surround speaker, an electronic game device, a printer, a cordless phone and other business and consumer device.

12. A computer readable medium storing a computer program to perform a method of acknowledging the receipt of a transmitted data stream in a wireless personal area network (WPAN), the method comprising:
  receiving a plurality of medium access control (MAC) service data units (MSDUs) from a transmitting entity, wherein at least one of the received MSDUs is fragmented into a plurality of fragmented packets (MPDUs) and wherein at least one of the received MSDUs is non-fragmented;
  determining whether the received MSDUs are fragmented or not;
  for only the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUs each of the at least one fragmented MSDU is fragmented into;
  generating a delayed acknowledgement frame which includes the generated bitmap field, wherein the delayed acknowledgement frame further comprises a section configured to acknowledge the at least one non-fragmented MSDU without the use of a bitmap field; and
  sending the delayed acknowledgement frame to the transmitting entity.

13. A system for acknowledging the receipt of a transmitted data stream in a wireless personal area network (WPAN), the system comprising:
  means for receiving a plurality of medium access control (MAC) service data units (MSDUs) from a transmitting entity, wherein at least one of the received MSDUs is fragmented into a plurality of fragmented packets (MPDUs) and wherein at least one of the received MSDUs is non-fragmented;
  means for determining whether the received MSDUs are fragmented or not;
  means for, for only the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUs each of the at least one fragmented MSDU is fragmented into;
  means for generating a delayed acknowledgement frame which includes the generated bitmap field, wherein the delayed acknowledgement frame further comprises a section configured to acknowledge the at least one non-fragmented MSDU without the use of a bitmap field; and
  means for sending the delayed acknowledgement frame to the transmitting entity.

14. A method of acknowledging the receipt of a transmitted data stream in a wireless personal area network (WPAN), the method comprising:
  receiving a plurality of medium access control (MAC) service data units (MSDUs) from a transmitting entity, wherein at least one of the received MSDUs is fragmented into a plurality of fragmented packets (MPDUs);
  determining whether the received MSDUs are fragmented or not;
  for the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUs each of the at least one fragmented MSDU is fragmented into;
  generating a delayed acknowledgement frame which includes the generated bitmap field; and
  sending the delayed acknowledgement frame to the transmitting entity.

15. A system for acknowledging the receipt of a transmitted data stream in a wireless personal area network (WPAN), the system comprising:
  means for receiving a plurality of medium access control (MAC) service data units (MSDUs) from a transmitting entity, wherein at least one of the received MSDUs is fragmented into a plurality of fragmented packets (MPDUs);
  means for determining whether the received MSDUs are fragmented or not;
  means for, for the MSDU(s) determined as fragmented, generating a bitmap field which includes a plurality of bitmap values corresponding to the MPDUs, wherein each of the plurality of bitmap values is indicative of whether each of the MPDUs is received or not, and wherein the size of each of the bitmap fields for each of the at least one fragmented MSDU varies according to the number of MPDUS each of the at least one fragmented MSDU is fragmented into;
  means for generating a delayed acknowledgement frame which includes the generated bitmap field; and
  sending the delayed acknowledgement frame to the transmitting entity.

* * * * *

UNITED STATES PATENT AND TRADEMARK OFFICE
CERTIFICATE OF CORRECTION

PATENT NO. : 7,433,314 B2  
APPLICATION NO. : 10/928067  
DATED : October 7, 2008  
INVENTOR(S) : Sharma et al.

Page 1 of 1

It is certified that error appears in the above-identified patent and that said Letters Patent is hereby corrected as shown below:

| Column | Line | |
|---|---|---|
| 1 | 44 | Change "CERTAIN" to --CERTAIN INVENTIVE--. |
| 2 | 31 | Change "(MPDUS)" to --(MPDUs)--. |
| 12 | 45 | In Claim 15, change "MPDUS" to --MPDUs--. |

Signed and Sealed this

Twenty-first Day of April, 2009

JOHN DOLL  
*Acting Director of the United States Patent and Trademark Office*